United States Patent
Pham et al.

(10) Patent No.: US 9,973,698 B2
(45) Date of Patent: May 15, 2018

(54) RAPID SHAKE DETECTION USING A CASCADE OF QUAD-TREE MOTION DETECTORS

(71) Applicant: CANON KABUSHIKI KAISHA, Tokyo (JP)

(72) Inventors: Quang Tuan Pham, North Ryde (AU); Amit Kumar Gupta, Epping (AU)

(73) Assignee: Canon Kabushiki Kashia, Tokyo (JP)

(*) Notice: Subject to any disclaimer, the term of this patent is extended or adjusted under 35 U.S.C. 154(b) by 15 days.

(21) Appl. No.: 14/551,581

(22) Filed: Nov. 24, 2014

(65) Prior Publication Data
US 2015/0146022 A1 May 28, 2015

(30) Foreign Application Priority Data
Nov. 25, 2013 (AU) .................. 2013260753

(51) Int. Cl.
*H04N 5/232* (2006.01)
*G06T 7/207* (2017.01)

(52) U.S. Cl.
CPC ......... *H04N 5/23254* (2013.01); *G06T 7/207* (2017.01)

(58) Field of Classification Search
CPC ... G08B 13/19602; G06T 7/20–7/2093; H04N 5/144–5/147; H04N 5/23254
See application file for complete search history.

(56) References Cited

U.S. PATENT DOCUMENTS

| | | | | |
|---|---|---|---|---|
| 5,107,293 A | * | 4/1992 | Sekine | G02B 7/36 348/208.99 |
| 5,895,138 A | | 4/1999 | Oku et al. | |
| 6,002,428 A | | 12/1999 | Mastumura et al. | |
| 6,717,612 B1 | | 4/2004 | Matsumura | |
| 2005/0114093 A1 | * | 5/2005 | Cha | H04N 19/139 702/189 |
| 2008/0094479 A1 | * | 4/2008 | Yost | H04N 5/23212 348/208.99 |
| 2010/0066842 A1 | * | 3/2010 | Narasimha | H04N 5/2352 348/208.4 |
| 2010/0079606 A1 | * | 4/2010 | Batur | G06T 7/20 348/208.6 |

(Continued)

OTHER PUBLICATIONS

Szeliski et al., "Motion Estimates with Quadtree Splines," Cambridge Research Laboratory, Mar. 1995.*

(Continued)

*Primary Examiner* — Dennis Hogue
(74) *Attorney, Agent, or Firm* — Canon USA, Inc. I.P. Division

(57) ABSTRACT

A method of determining stability of a camera comprises capturing an image with the camera and then (A) determining a magnitude of motion for each region of a current sub-division of the image. A step (B) then determines a number of the magnitudes of motion not larger than a magnitude threshold associated with the current sub-division, and where the determined number is greater than or equal to a region threshold associated with the number of regions in the current sub-division, (i) determining the camera to be stable, or otherwise (ii) dividing the current sub-division of the image into a further sub-division and repeating steps (A) and (B) upon the further sub-division.

11 Claims, 9 Drawing Sheets

(56) References Cited

U.S. PATENT DOCUMENTS

| | | | | |
|---|---|---|---|---|
| 2011/0157392 A1* | 6/2011 | Chou | ..................... | H04N 5/144 |
| | | | | 348/222.1 |
| 2011/0193978 A1* | 8/2011 | Wu | ................... | H04N 5/23248 |
| | | | | 348/208.6 |
| 2012/0183179 A1* | 7/2012 | Susca | .................. | G01C 21/165 |
| | | | | 382/107 |
| 2013/0342714 A1* | 12/2013 | Zhou | ................. | H04N 5/23267 |
| | | | | 348/208.2 |

OTHER PUBLICATIONS

Vasileios Argyriou; Theodore Vlachos. Quad-Tree Motion Estimation in the Frequency Domain Using Gradient Correlation. IEEE Transactions on Multimedia 2007, 9, pp. 1147-1154.

* cited by examiner

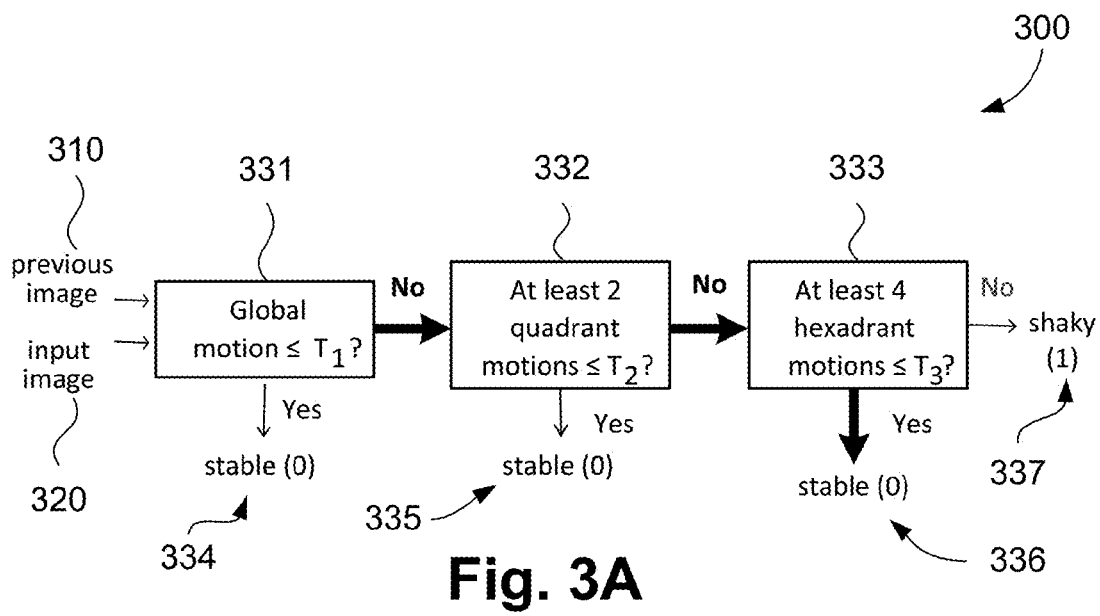
Fig. 3A
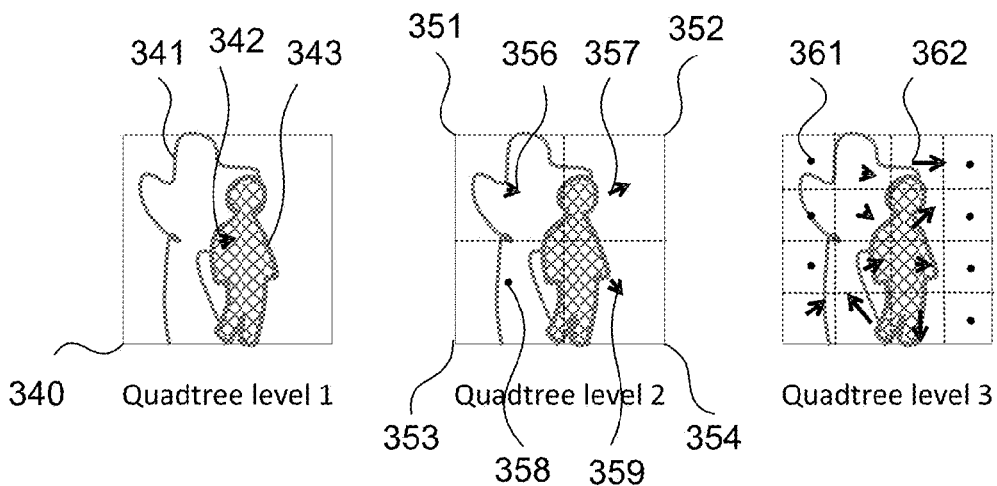
Fig. 3B(1)   Fig. 3B(2)   Fig. 3B(3)

RAPID SHAKE DETECTION USING A CASCADE OF QUAD-TREE MOTION DETECTORS

REFERENCE TO RELATED PATENT APPLICATION(S)

This application claims the benefit under 35 U.S.C. § 119 of the filing date of Australian Patent Application No. 2013260753, filed Nov. 25, 2013, hereby incorporated by reference in its entirety as if fully set forth herein.

TECHNICAL FIELD

The current invention relates to digital video processing and, in particular, to the detection and characterisation of shakes from video frames.

BACKGROUND

A video is a sequence of images. The images are often referred to as frames. The terms 'frame' and 'image' are used interchangeably throughout the art and this specification to describe a single image in an image sequence, or a single frame of a video. If a video is captured by a static camera, the background content of the video is said to be stable. Even if the camera is mounted on a fixed platform, the camera can undergo some motion if the platform is shaken or is unstable. The camera motion affects the whole frame, which appears shifted from a previous frame. Shake or instability can therefore be detected by motion estimation between different, often adjacent, frames from the video.

If the shake is of small magnitude compared to the frame size or of low-frequency compared to the frame rate, motion between shaky frames can be approximated by a global translation. Some prior art methods rely on two-dimensional (2D) motion estimation between adjacent video frames to detect shake. However, there are several problems to this global motion estimation approach. First, moving objects in the scene can lead to inaccurate global motion estimation. The larger of moving object, the more bias that object adds to the estimated global motion. Second, dynamic background can also cause disturbance to the estimated global motion. Dynamic background refers to the repetitive motion of some background elements, such as outdoor tree movement or indoor rolling escalators. Prior art methods that estimate global motion from bottom-up (i.e. from block-based motion estimation) may be susceptible to this cyclic motion of the dynamic background. Third, low signal-to-noise ratio (SNR) may make accurate motion estimation difficult. Low SNR cases include, but are not limited to, high noise in low-lit scene, saturated highlights in night scenes, and low texture scenes. Low SNR is a common problem to all scene-based shake detection methods.

The detection of shake is useful for many applications, one of which is video change detection using background modelling. Because camera shake shifts image content, the whole shaky frame can be detected as change and the background model is not updated accordingly. This not only causes false detection in the current frame but also leads to a degraded performance of the system over subsequent frames due to the non-updated background model.

As mentioned above, most prior art methods rely on 2D motion estimation for shake detection. 2D shift estimation is costly for large image sizes (e.g. VGA resolution at 640×480 pixels, or full HD resolution at 1920×1080 pixels). Although the frame can be subsampled to a smaller size, the estimated motion on a subsampled image is less accurate. Another way to avoid motion estimation on the large video frames directly is to partition the frames into small image blocks, for which the motion of each can be estimated separately. For videos encoded with temporal information (e.g. in MPEG-2 or H.264 codec), the quantised motions of macro blocks are used by some prior art methods for background stabilisation or foreground tracking. The 16×16-pixel macro blocks are, however, too small for a reliable motion estimation. As a result, one prior art method groups several adjacent macro blocks together to form a large region. The macro-block motions are then combined for a more reliable motion estimation of the region. One limitation of using motion vectors from the compression stream is that these macro-block motion vectors may not be very accurate. Macro-block motion estimation is known to optimise for compression ratio rather than accuracy.

If the aggregation of macro-block motions is seen as a bottom-up approach in shake detection, a top-down approach would successively sub-divide the image for the purpose of motion detection. Quad-tree motion estimation is an example of this top-down approach, in which a motion vector is estimated for each of the four image quadrants. The quadrant division is accepted if the total sum of squared errors (SSE) of the quadrant pairs after motion compensation reduces compared to the SSE of the image pair before division. Each quadrant is sub-divided further if the SSE further reduces. This selective quad-tree subdivision results in an unbalanced quad-tree partitioning of the input video frame into rectangular regions, where each undergoes a homogeneous translational motion. These sparse set of translational motion vectors can be interpolated to a full warp map. The technique can be adapted for shake detection and global background motion estimation. One limitation of this quad-tree motion estimation technique is the motion of each image patch is estimated using 2D phase correlation, which requires transforming the input images to the Fourier domain and back to the spatial domain.

To avoid the computational complexity and high memory requirement of 2D motion estimation, some prior art methods perform independent shift estimation along the X- and Y-dimension using image projections. The 2D intensity or gradient energy image is accumulated along the X- and Y-dimensions to provide 1D profiles along the Y- and X-dimensions, respectively. The 1D profiles between 2 images are then aligned to find the translations in X and Y. Image registration from axis-aligned projections works because natural scenes usually contain horizontal and vertical structures, which show up as alignable peaks in the gradient projection profiles. Additionally, the projections can be accumulated along the 45 and 135 degree orientation to improve the alignment accuracy. Projection-based motion estimation can be used for shake detection, however the projection profiles are easily corrupted under moving foreground object or dynamic background, making the estimated motion unreliable.

To reduce the influence of moving foreground objects in global motion estimation, some prior art methods keep an updated background model for motion estimation against an incoming video frame. The background is updated with an aligned incoming frame using block based motion estimation. These methods also detect the foreground and mask the detected foreground out when updating the background to avoid corrupting the background model with foreground intensities. By aligning the current frame to the background model instead of a previous frame, the foreground objects in the previous frame do not corrupt the motion estimation.

However, the foreground objects in the current frame still can corrupt the estimated motion.

While camera shake detection can be used to improve change detection in video, there are prior art change detection methods that avoid shake detection altogether. Robustness to small shake is built into the change detection mechanism by matching an incoming pixel with a set of neighbouring pixels in the background model. As long as the local motion caused by shake is smaller than the size of the matching neighbourhood, the change detection method can avoid the false detection due to global motion. There is one drawback to this neighbourhood matching method in that slowly moving foreground objects may become blended into the background model and thus would not be detected as change.

None of the above-mentioned shake detection method can achieve real-time, accurate shake detection in the presence of large moving foreground objects. Hence, there is a need for an improved shake detection method, and particularly within a system that is efficient, and hardware-friendly, and where the detection is robust to dynamic content in the scene.

SUMMARY

According to one aspect of the present disclosure there is provided a method of detecting shake of a camera, comprising:

capturing an image with the camera;

determining a magnitude of a motion from at least the image;

where the determined magnitude of motion is not larger than a first threshold, determining the camera to be stable;

where the determined magnitude of motion is larger than the first threshold, determining if a magnitude of motion for each of a number of blocks of the image is larger than at least one further threshold; and determining the shake of camera based on the number of motions having a magnitude exceeding the at least one further threshold.

Desirably the at least one further threshold comprises a second threshold associated with a quadtree level 2 number of blocks, and a third threshold associated with a quadtree level 3 number of blocks. Generally the first threshold is smaller than the at least one further threshold.

Preferably the motion between corresponding blocks in the image is computed from a correlation of image projection profiles.

Preferably the image projection profiles comprise a sum of image intensities along a projection direction (x, y) of the image projection profiles. Typically the image projection profiles comprise a sum of image gradient magnitudes along a projection direction of the image projection profiles.

In another implementation the image projection profiles are complex with a real component and an imaginary component being one of (i) a sum of image intensities along a projection direction of the image projection profiles, and (ii) a sum of image gradient magnitudes along the projection direction.

In a further implementation the image projection profiles are pre-computed for quadtree blocks at a finest level, from which image projection profiles for quadtree blocks at coarser levels are derived.

According to another aspect there is provided a method of detecting shake of a camera, comprising:

segmenting a previous image captured by the camera into a foreground region and a background region;

estimating a background region of a current image using tracking of the foreground region of the previous image;

determining an amount of motion in the current image from the estimated background region of the current image and the background region of the previous image; and determining the shake of camera based on the determined amount of motion from the background region of the current image.

Preferably the determining the shake of the camera comprises using the determined amount of motion to warp the current image into alignment with the previous image, and detecting change in the aligned current image. Advantageously this method further comprises updating the background region with the detected change for application to a subsequent image.

According to another aspect, disclosed is a method of detecting changed regions in a video, comprising:

determining whether a current frame of in the video is shaky;

detecting changed regions using one set of parameters where the current frame is a non-shaky frame; and detecting changed regions using a different set of parameters where the current frame is a shaky frame.

Another method involves detecting changed pixels in a video using a background model, comprising:

obtaining a previously detected foreground mask from a previous frame of the video;

tracking the foreground mask from the previous frame to a probable foreground region in a current frame of the video;

selecting a plurality of image blocks in the current frame outside the probable foreground region;

determining a plurality of motion vectors from the selected image blocks of the current frame and corresponding image blocks of a reference frame;

determining a global motion of the current frame with respect to the reference frame using the determined motion vectors;

warping the current frame using the determined global motion to correct for misalignment between the current frame and the reference frame;

performing change detection of the current frame using the warped frame and the background model; and updating the background model using change detection results of the current frame.

Desirably the reference frame comprises a background model (610) of a previous frame of the video.

According to another aspect, provided is a method of determining stability of a camera, comprising:

capturing an image with the camera;

(A) determining a magnitude of motion for each region of a current sub-division of the image;

(B) determining a number of the magnitudes of motion not larger than a magnitude threshold associated with the current sub-division, and where the determined number is greater than or equal to a region threshold associated with the number of regions in the current sub-division, (i) determining the camera to be stable, or otherwise (ii) dividing the current sub-division of the image into a further sub-division and repeating steps (A) and (B) upon the further sub-division.

Typically, step (A) is performed at least twice.

Preferably wherein the sub-division is a global cascading quad-tree sub-division.

Desirably, where, after three traversals of step (B) the camera is not determined to be stable, the camera is deemed to be unstable.

According to another aspect, disclosed is apparatus for detecting shake of a camera, the apparatus comprising:
an input for an image captured with the camera;
a processor coupled to the input and configured to:
determine a magnitude of a motion from at least the image, and where the determined magnitude of motion is not larger than a first threshold, determining the camera to be stable; and
where the determined magnitude of motion is larger than the first threshold, determining if a magnitude of motion for each of a number of blocks of the image is larger than at least one further threshold, and determining the shake of camera based on the number of motions having a magnitude exceeding the at least one further threshold.

Preferably the apparatus is one of (i) formed within the camera, (ii) a computing device to which the camera can be coupled, and (iii) a server computer to which the camera couples via a network, and the input includes a memory into which the image captured from the camera is stored.

Other aspects, including a computer program product for detecting shake of a camera, are also disclosed.

BRIEF DESCRIPTION OF THE DRAWINGS

At least one embodiment of the invention will now be described with reference to the following drawings, in which:

FIG. 3A is a flow diagram of a process of shake detection between two images using a cascade of quadtree motion detectors;

FIGS. 3B(1)-3B(3) illustrate quadtree partitioning of an image for the motion detection in FIG. 3A;

DETAILED DESCRIPTION INCLUDING BEST MODE

The present disclosure is directed towards providing an efficient, low-cost, and accurate camera shake detection method for videos with potential moving objects. The preferred shake detection method is implemented as a cascade of quad-tree motion detectors. At the first level of the cascade, a global translational motion is estimated. At the second level of the cascade, the image is divided into four quadrants, and at the next level, each quadrant is further subdivided into four hexadrants, and so on. Within each level, motions of all subdivided image blocks are estimated using projection-based shift estimation. Once a sufficient number of blocks with small motion are detected, the current frame is declared stable. Otherwise, the method proceeds to the next level of the cascade to detect further motions of even smaller blocks.

The cascade shake detection method is efficient and low-cost because the motion of corresponding image blocks is estimated using one-dimensional (1D) projection profiles. The number of motion estimations is also minimised for a given video content. For example, if the scene does not contain any moving object, shake of the camera caused by external factors can be detected immediately after the first level of the cascade (i.e. by a global motion). Once there are moving foreground objects, the method subdivides the video frame into smaller blocks until there are a sufficient number of blocks not occupied by the foreground object. If enough of these subdivided blocks have negligible motions, the current frame can again be classified as stable. Under a typical surveillance scenario where the scene is empty or static for a majority of the time, this cascaded method can often make a correct decision within the first level of the cascade. Because the image is successively divided into smaller quadtree blocks, the proposed method is robust to moving object in the scenes. As long as the moving objects do not occupy the entire frame, there will be a quadtree level with sufficient number of background-only blocks for background shake detection.

In case shake is detected, the shake of the camera can be characterised (i.e. measured) based on reliable estimated block motion vectors.

The disclosed shake detection and characterisation method can be used as a pre-processing step in a video change detection system. If a current frame is classified as stable, the change detection system processes the frame as usual. If the frame is classified as shaky, the change detection system can either skip updating the background for this frame or attempt to correct for the misalignment due to shake before processing the aligned frame as usual. Alternatively, a change detection system can be modified to handle shaky frames differently from non-shaky frames.

Figure 1:
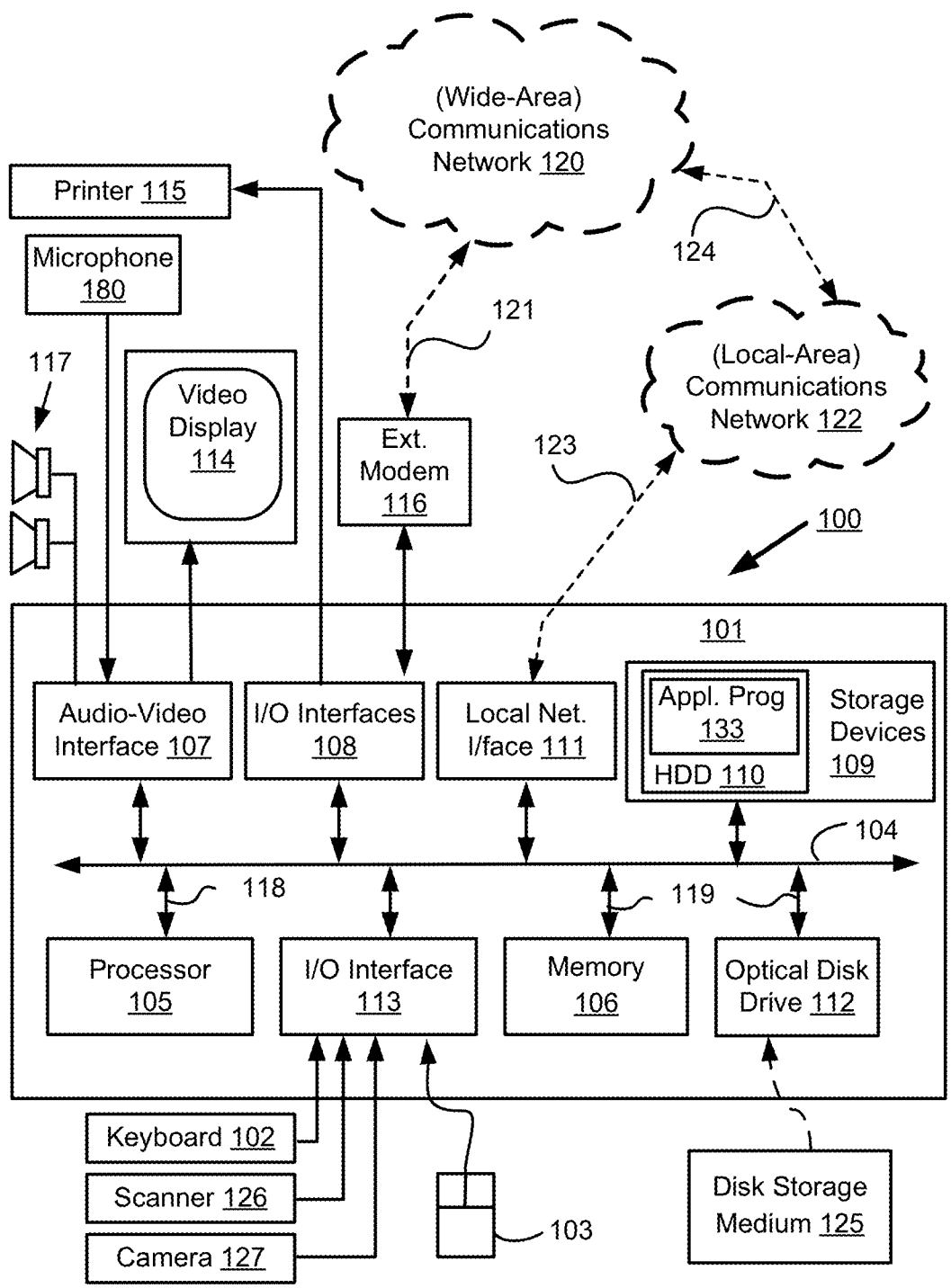
FIGS. 1 and 2 collectively form a schematic block diagram of a general purpose computer system upon which arrangements described can be practised.
Figure 2:
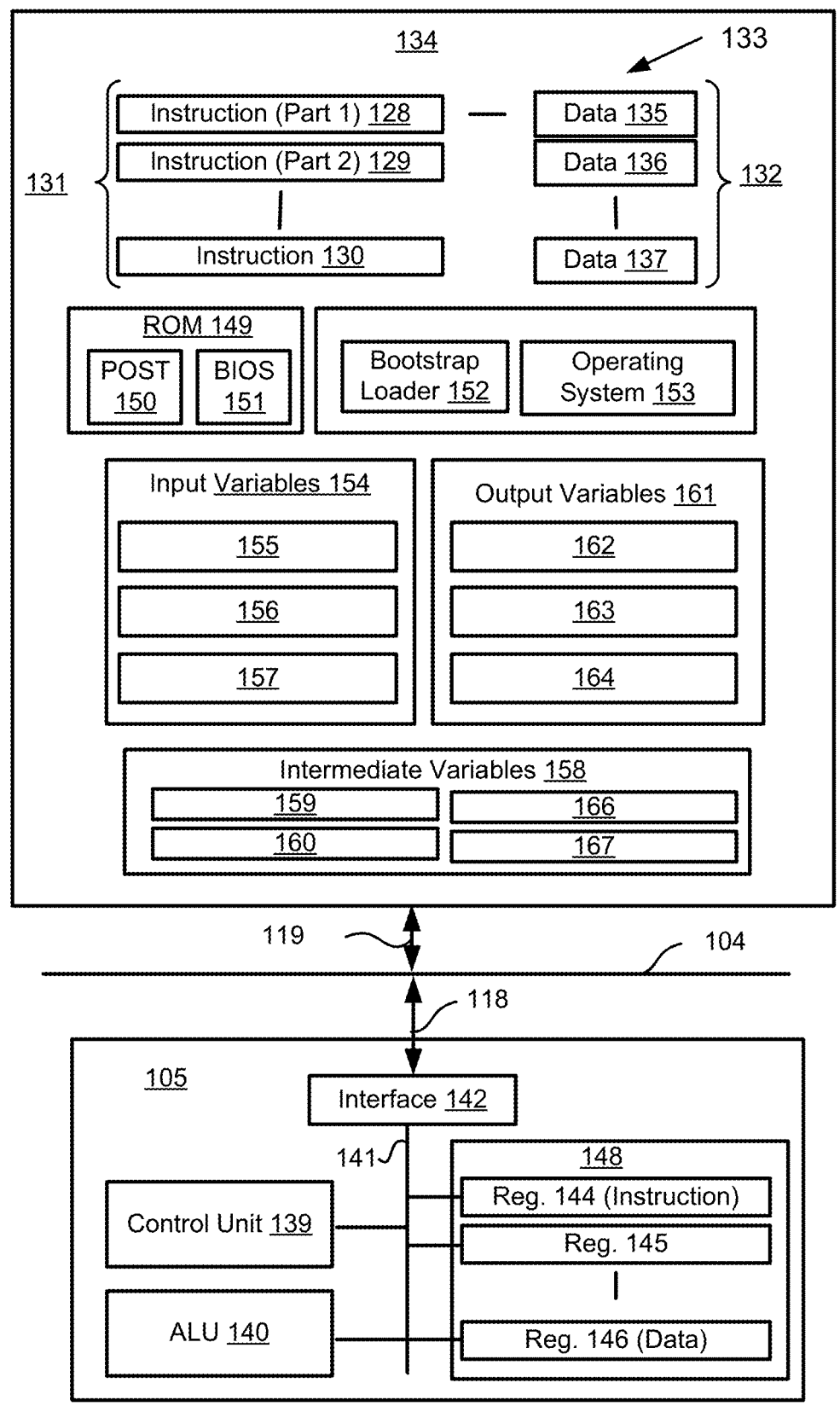

FIGS. 1 and 2 depict a general-purpose computer system 100, upon which the various arrangements described hereinafter can be practised.

As shown in FIG. 1, the computer system 100 includes: a computer module 101; input devices such as a keyboard 102, a mouse pointer device 103, a scanner 126, a camera 127, and a microphone 180; and output devices including a printer 115, a display device 114 and loudspeakers 117. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. The at least one processor unit 105 may be programmed to perform the steps of the methods described herein. The memory unit 106 may, for example, have semiconductor random access memory (RAM) and semiconductor read only memory (ROM). The computer module 101 also includes an number of input/ output (I/O) interfaces including: an audio-video interface 107 that couples to the video display 114, loudspeakers 117, and microphone 180; an I/O interface 113 that couples to the keyboard 102, mouse 103, scanner 126, camera 127 and optionally a joystick or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1, the local communications network 122 may also couple to the wide network 120 via a connection 124, which would typically include a so-called "firewall" device or device of similar functionality. The local network interface 111 may comprise an Ethernet™ circuit card, a Bluetooth™ wireless arrangement, or an IEEE 802.11 wireless arrangement; however, numerous other types of interfaces may be practised for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PCs and compatibles, Sun Sparcstations, Apple Mac™, or alike computer systems.

The methods of video shake detection and characterisation may be implemented using the computer system 100, wherein the processes of FIGS. 3 to 9, described hereinafter, may be implemented as one or more software application programs 133 executable within the computer system 100. In particular, the steps of the method of video shake detection and characterisation are effected by instructions 131 (see FIG. 2) in the software 133 that are carried out within the computer system 100. The software instructions 131 may be formed as one or more code modules, each for performing one or more particular tasks. The software may also be divided into two separate parts, in which a first part and the corresponding code modules perform the segmenting methods and a second part and the corresponding code modules manage a user interface between the first part and the user.

In one example, the video frames or input images on which shake detection or shake characterisation is performed are captured by the camera 127 and passed to the computer module 101 for storage in the HDD 110 and processing using the processor 105. In another example, the images on which shake detection or shake characterisation is performed are retrieved from storage, such as the disk storage medium 125, one of the storage devices 109, or any combination thereof. In a further example, one or more of the images on which shake detection or shake characterisation is performed are received by the computer module 101 by a communications link, such as one of the communications networks 120, 122.

The software may be stored in a computer readable storage medium, including the storage devices described below, for example. The software is loaded into the computer system 100 from the computer readable storage medium, and then executed by the computer system 100. A computer readable storage medium having such software or computer program recorded on the computer readable medium is a computer program product. The use of the computer program product in the computer system 100 preferably effects apparatus for image processing, including, for example, a camera and a computing device for segmenting images.

The software 133 is typically stored in the HDD 110 or the memory 106. The software is loaded into the computer system 100 from a computer readable medium, and executed by the computer system 100. Thus, for example, the software 133 may be stored on an optically readable disk storage medium (e.g., CD-ROM) 125 that is read by the optical disk drive 112.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101, include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 2 is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1.

When the computer module 101 is initially powered up, a power-on self-test (POST) program 150 executes. The POST program 150 is typically stored in a ROM 149 of the semiconductor memory 106 of FIG. 1. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS)module 151, also typically stored in the ROM 149, for correct operation. Once the POST program 150 has run successfully, the BIOS 151 activates the hard disk drive 110 of FIG. 1. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1 must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 2, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternatively, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 122, data retrieved from one of the storage devices 106, 109 or data retrieved from a storage medium 125 inserted into the corresponding reader 112, all depicted in FIG. 1. The execution of a set of the instructions may in some cases result in output of data. Execution may also involve storing data or variables to the memory 134.

The disclosed image processing arrangements use input variables 154, which are stored in the memory 134 in corresponding memory locations 155, 156, 157. The image processing arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 2, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

(a) a fetch operation, which fetches or reads an instruction 131 from a memory location 128, 129, 130;

(b) a decode operation in which the control unit 139 determines which instruction has been fetched; and (c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 3 to 9 is associated with one or more segments of the program 133 and is performed by the register section 144, 145, 146, the ALU 140, and the control unit 139 in the processor 105 working together to perform the fetch, decode, and execute cycles for every instruction in the instruction set for the noted segments of the program 133.

FIG. 3A shows a flow diagram illustrating a shake detection process 300 performed on the processor 105 to produce a shake classification of a current input image 320 given a previous image 310, which is also known as a reference image. The previous image 310 need not immediately precede the current image 320. In a first step 331, a global translational motion is estimated between the two images 310 and 320. If the magnitude of the global motion is less than or equal to a first threshold $T_1$, the input image 310 is considered stable 334 compared to the reference image 320 and the process 300 finishes for the input frame 320. If the magnitude of the global motion is greater than the first threshold $T_1$, the process 300 continues to the next step. At a second step 332, both images 310 and 320 are subdivided into four quadrants and the translational motions of individual quadrants are computed. If two or more than quadrants have magnitudes of motion less than or equal to a second threshold $T_2$, the input image 310 is considered stable 335 compared to the reference image 320 and the process 300 finishes at step 332. Otherwise, the shake detection process 300 continues to the next step. At a third step 333, each quadrant of the images is further subdivided into four sub-quadrants and the translational motions of individual sub-quadrants are computed. Because there are now sixteen of these sub-quadrants, they are also called hexadrants. Similar to the second step, if there are four or more of the hexadrants with motions less than or equal to a third threshold $T_2$, the input image 310 is considered stable 336. Otherwise, the input image 310 is classified as shaky 337.

The shake detection method 300 in FIG. 3A can be described as a cascade of motion detectors. At each level of the cascade, a motion detector is invoked to determine whether the input image can be classified as stable or not. If the input image is classified as stable, the method 300 immediately returns a negative decision without further processing. If the input image cannot be classified as stable at the current level, it does not necessarily mean that the input image is shaky. Instead, it means more processing is required and the method progresses to the next level of the cascade. Because the cascade starts with a most simple classifier at the first level and has increasing computational complexity at subsequent levels, the earlier in the cascade the method 300 can confidently rule out a shake (i.e. stable detection), the more efficient is the method 300. As the method 300 progresses to the next cascade level, a more sophisticated classifier is used. These sophisticated classifiers are also more robust to challenging scenarios like dynamic background or moving foreground objects. At the final level of the cascade, the method either produces a stable (i.e. 0 or negative detection) or shaky (i.e. 1 or positive) decision because there are no more level to progress to. FIG. 3A depicts a 3-level cascade but the number of cascade levels can be two or more.

FIGS. 3B(1)-3B(3) illustrate the concept of quadtree partitioning of an image across multiple levels. Starting with a block 340 as seen in FIG. 3B(1) occupying the whole image at quadtree level 1, each block is successively subdivided into four sub-blocks at subsequent levels. At quadtree level 2 as seen in FIG. 3B(2), for example, the whole image block 340 is divided into four quadrants 351, 352, 353, 354. Each of these quadrants is further subdivided into four hexadrants at quadtree level 3, as seen in FIG. 3B(3). As a result, the image 340 is partitioned into 16 (roughly) equal image blocks at quadtree level 3. Image blocks at a finer level such as 351, 352, 353, 354 lie fully inside their parent block 340 at a coarser level. This leads to a quadtree partitioning scheme of nested image blocks.

The input images 310 and 320 are divided into sub-blocks by quadtree partitioning for the purpose of block-based motion detection. At a coarsest level (quadtree level 1), a global motion vector 342 is estimated between the two input images. An example is illustrated in FIG. 3B(1) where the image 340 contains a static object 341 (a biological tree) in the background and a moving person 343 in the foreground. Due to the moving foreground, the estimated global motion vector 342 is non-zero (i.e. above the threshold $T_1$). As a result, the shake detection process progresses to the next level (quadtree level 2) to estimate four motion vectors 356, 357, 358, 359, each corresponding to one of the four quadrants 351, 352, 353, 354. Because only one out of four quadrant motions is less than the second threshold $T_2$ (e.g. the motion vector 358 is shown as a dot for negligible motion instead of an arrow for a significant motion vector, such as the vector 359), process 300 moves to the next level. At quadtree level 3, there are 7 hexadrant blocks with motion less than or equal to $T_3$, (361 is one of them), while the remaining 9 hexadrant blocks have motion larger than $T_3$ (362 is one of them). The present inventor has established a preferred criterion that an input image is considered stable if there are at least N blocks in an N×N block partitioning having motion less than or equal to a threshold, the shake detection process 300 exits at quadtree level 3 (4×4) with a negative decision (i.e. stable). Here the criterion reduces with the square root of the number of blocks. Other criteria may be used, such as a simple percentage, but such does not readily contribute to effectiveness at higher quadtree levels.

The motion thresholds $T_i$ (i=1, 2, 3 . . . ) used in the shake detection process 300 can be determined prior to shake detection. The motion thresholds can have the same value, for example, $T_i$=0.05 pixel (i=1, 2, 3 . . . ) if shake is determined as having background motion larger than 0.05 pixels. Other threshold values can also be used. For example, $T_i$ can be as large as 5 pixels if some video system is interested in detecting global motion beyond 5 pixels only. Alternatively, the motion thresholds $T_i$ can be set to a different value at each level. A common strategy is to set a low motion threshold at earlier levels to immediately reject very stable frames with small or no moving objects, and set an increasing motion threshold at later levels to handle more difficult cases of dynamic background or frames with large moving objects.

The method of FIGS. 3A-3B(3) provide more generically for a method of determining stability of the camera 127 which has captured the input (current) image 320. In the step 331, a generic approach is applied to determine a magnitude of motion for each region of a current sub-division of the image. With the original image 320, there is only a single region (FIG. 3B(1)) and the sub-division is a null, meaning the image is whole. This approach then determines a number (N) of the magnitudes of motion not larger than a magnitude threshold ($T_1$) associated with the current sub-division. Since in the example of FIG. 3A at step 331 there is only one region, only a single (global) motion magnitude is determined. Where the determined number (N) is greater than or equal to a region threshold associated with the number of regions in the current sub-division, in this case N=1, then the camera is determined to be stable (step 334). Otherwise the current sub-division of the image is divided into a further sub-division, such as shown in FIG. 3B(2) and process repeated upon the further sub-division. The further sub-division is the FIG. 3B(2) and again the generic approach determines a magnitude of motion for each region of a current sub-division (i.e. the blocks 351-354) of the image. The approach then determines a number of the magnitudes of motion not larger than a magnitude threshold ($T_2$) associated with the current sub-division, and where the determined number is greater than or equal to a region threshold (N=2) associated with the number of regions (2×2) in the current sub-division, then (i) determining the camera to be stable (335), or otherwise (ii) dividing the current sub-division of the image into a further sub-division and repeating the approach upon the further sub-division. Now the further sub-division is the 4×4 block arrangement of FIG. 3B(3). The approach then determines a number of the magnitudes of motion not larger than a magnitude threshold ($T_3$) associated with the current sub-division, and where the determined number is greater than or equal to a region threshold (N=4) associated with the number of regions (4×4) in the current sub-division, and if so determining the camera to be stable (336). In the specific example of FIGS. 3A and 3B the process stops after 3 levels, and so if the camera is not determined to be stable, the camera is deemed to be shaky (337) after step 333. Where desired, further levels of sub-division may be used. Also in some implementations the regional sub-division need not be quad-tree based. For example, the initial whole image may simply be divided into two halves and each processed in the manner described above. Other approaches to sub-division may be used however the quad-tree sub-division is preferred as such delivers a nested process which continually refines the motions and the corresponding thresholds to deliver a more accurate result with fewer level transitions. The sub-divisions of FIGS. 3B(1)-3B(3) are an example of a global cascading quad-tree sub-division.

The determination of multiple motion thresholds can be automated given training videos with ground-truth annotations of stable (negative) or shaky/unstable (positive) for some frames. Machine learning techniques can be used to optimally set the thresholds to match the detection results with the ground-truth annotation. These learnt thresholds will take care of the unspecified classification rules embedded in the ground-truth annotation. For example, if the annotation was done by a visually acute person, who can detect even a minute amount of background movement, the method will mimic this motion sensitivity by setting small (usually subpixel) motion thresholds. On the other hand, if the annotator was a visually impaired person, who only detects gross background movements, the learnt thresholds will be set to a large value (e.g. in an order of several pixels), resulting in a less sensitive shake detection method.

A machine learning algorithm that learns the motion thresholds from binary classified training data using the receiver operating characteristic (ROC) curve is now described. The ROC curve illustrates the performance of a binary classifier system as the discrimination threshold of the binary classifier system is varied. In the first level of the cascade shake detection, the motion threshold $T_1$ discriminates between negative samples (i.e. stable frames) and positive samples (i.e. frames to be investigated further). For each value of $T_1$, a video frame will have its detection result being either negative (i.e. stable) or positive (i.e. may be shaky). When comparing this detection with the ground-truth annotation, four scenarios can happen:

(i) A true positive (TP) detection happens when the system correctly detects the sample as shaky;

(ii) A true negative (TN) detection happens when the system correctly detects the sample as stable;

(iii) A false positive (FP) detection happens when the system incorrectly detects the sample as shaky;

(iv) A false negative (FN) detection happens when the system incorrectly detect the sample as stable.

The number of TP, TN, FP, FN detections are collected for all video frames with ground-truth classification. Denoting these numbers TP, TN, FP, FN, the detection rate, which is also known as sensitivity, recall, or true positive rate (TPR), is defined as:

$$TPR = \frac{TP}{TP + FN} \quad (1)$$

The TPR determines the percentage of positively detected samples that are correctly detected. A false positive rate (FPR), on the other hand, defines the percentage of negative samples that are incorrectly detected as positive:

$$FPR = \frac{FP}{FP + TN} \quad (2)$$

The ROC curve is a plot of TPR versus FPR evaluated at different values of the discrimination threshold. Because TPR and FPR vary continuously as the threshold changes, the ROC traces a smooth curve over a collection of (TPR, FPR) points.

Figure 7A:
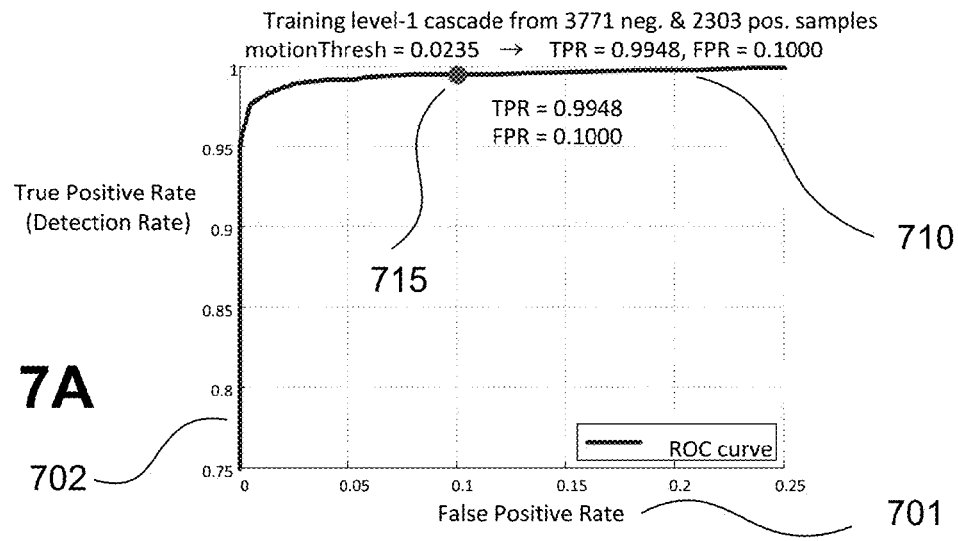
FIGS. 7A-7C illustrate examples of receiver operating characteristic (ROC) curves obtained from the quadtree motion detectors at different level of the cascade.

An example of the ROC curve for the first level of the cascaded shake detection process 300 is given in FIG. 7A.

In FIG. 7A, the true positive rate 702 is plotted against the false positive rate 701 for different values of the motion threshold $T_1$. The statistics of the data points on the ROC curve 710 are gathered from over 6000 frames with ground-truth annotation (60% more negative samples than positive samples). The closer the curve is to the top-left corner, where TPR=1 and FPR=0, the better is the performance of the binary classifier. Point 715 on the curve corresponds to a TPR $d_1$=0.9948 and a FPR $f_1$=0.1 is achieved with a motion threshold $T_1$=0.0235. This basically means if the motion threshold $T_1$ is set to 0.0235 pixel, only 0.52% of the shaky frames are incorrectly detected as stable while 10% of the stable frames are detected as non-stable. This relatively high percentage of false positive is acceptable in a cascade system because the false positive samples will be re-examined in the next level of the cascade. These false detections often correspond to stable frames with disturbances like dynamic background or moving foreground objects. These difficult frames can be classified more accurately using more robust classifiers down the track.

Figure 7B:
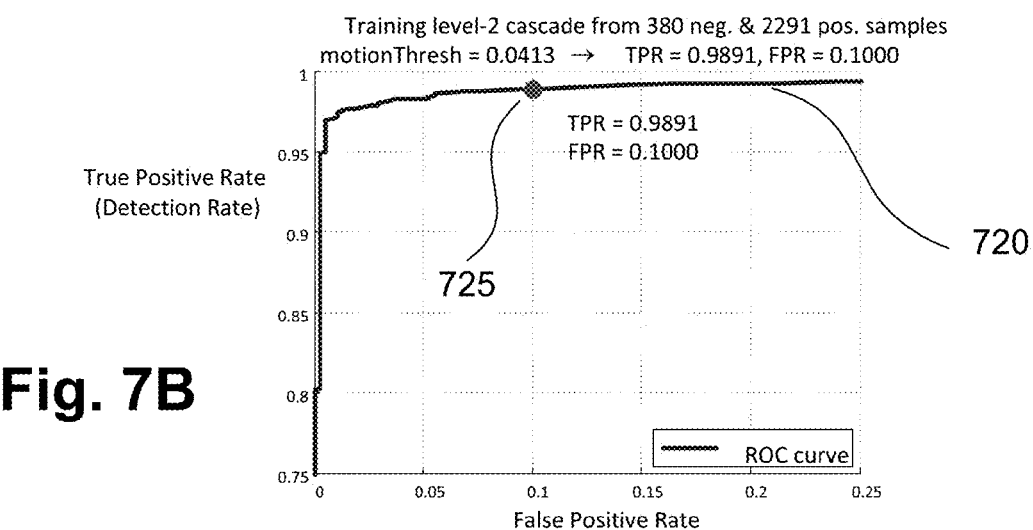
Figure 7C:
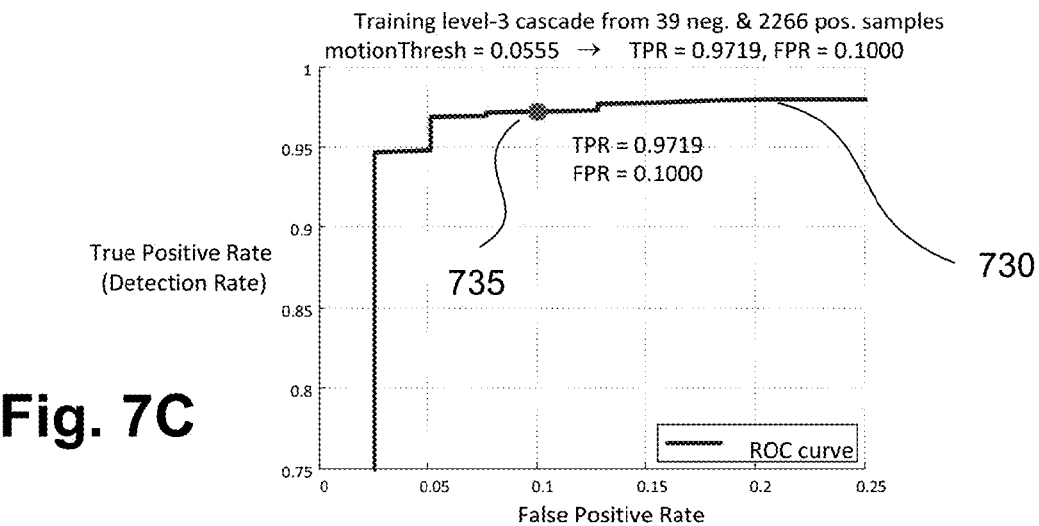

Using the motion threshold $T_1$=0.0235 at a FPR of 0.1 in the first classifier, roughly 90% of stable frames are correctly detected and withheld from further processing. Positively detected samples from the first level are fed into the second level of the cascade for re-classification. In the example in FIG. 7B, 2671 frames comprising of 380 stable and 2291 shaky frames are passed from the level 1 classifier (331) to the level 2 classifier (332). Note that the number of surviving stable frames reduces significantly because most were confidently classified in the first level. The number of surviving shaky frames reduces only slightly from 2303 in the first level to 2291 in the second level because 12 shaky frames are incorrectly labelled as stable in the first level. Visual inspection revealed that these 12 shaky frames appear either at the beginning or at the end of a shaky period, therefore their background motion is in the borderline of the detection threshold $T_1$. The performance of the classifier in the second level starts to show some degradation compared to the performance of the classifier in the first level of the cascade. This is evident as the ROC curve 720 in FIG. 7B is further away from the top-left corner of the figure compared to the ROC curve 710 in FIG. 7A. The reduction in classifier performance indicates that the level 2 classifier faces more challenging samples than that of the level 1 classifier, which is expected. Similar to level 1, a motion threshold $T_2$=0.0413 is chosen at point 725, where the FPR $f_2$=0.1. At this point, the TPR $d_2$ is measured 0.9891, representing a 1% false negative detection rate from the pool of samples that entering the second level of the cascade. This 1% of the positive samples will not be re-examined in subsequent classifier levels. Their classifications hence remain incorrectly as stable. However, 1% is still an acceptable false negative rate.

Given a motion threshold $T_1$=0.0235 pixel at level 1 and a motion threshold $T_2$=0.0413 at level 2, 39 negative samples and 2266 positive samples are passed on to the level 3 classifier. The ROC curve 730 for this level in FIG. 7C has a degraded performance compared to those from the previous two levels. A third motion threshold $T_3$=0.0555 pixel is chosen at point 735, where the FPR $f_3$=0.1 and TPR $d_3$=0.9719.

In the above example, a strategy of setting the FPR across all levels of the cascade to a fixed value of 0.1 is employed. After three levels of cascaded classifiers, this leads to an overall FPR $f = \Pi_{i=1}^{3} f_i = 0.1^3 = 0.001$ and an overall detection rate $d = \Pi_{i=1}^{3} d_i = 0.9948 \times 0.9891 \times 0.9719 = 0.9563$. 0.1% is a very low false positive rate and 95.63% is a good detection rate. Most false negative cases involve shaky frames under very small motion with respect to a previous frame.

Other strategies for multiple threshold selection can be used. For example, instead of fixing the FPR's, one can fix the TPR's across all levels. Specifically, if the overall target TPR is d=95%, the TPR's at each of the three cascade levels can be $d_i = \sqrt[3]{d} = 0.983$ (i=1, 2, 3). Another strategy is to select a threshold that optimises the $F_1$ measure at each level, where $F_1$ is a harmonic mean of precision and recall:

$$F_1 = 2 \times \frac{\text{precision} \times \text{recall}}{\text{precision} + \text{recall}} \quad (3)$$

$$\text{precision} = \frac{TP}{TP + FP}, \quad (4)$$

$$\text{recall} = TPR = \frac{TP}{TP + FN}$$

However, because the performance of the cascaded classifier system is a combination of the performances at all levels, it is not guaranteed that locally optimal $F_1$ measures lead to an optimal $F_1$ measure for the overall cascaded classifier system. With the fixed FPR or fixed TPR scheme, at least the overall FPR or TPR can be set and achieved.

The shake detection system 300 estimates a translational motion vector for each image block in the quadtree. To obtain these motion vectors efficiently, a projection-based shift estimation is used. Projection-based shift estimation is suitable for small motion between adjacent frames in a shaky video.

Figure 8:
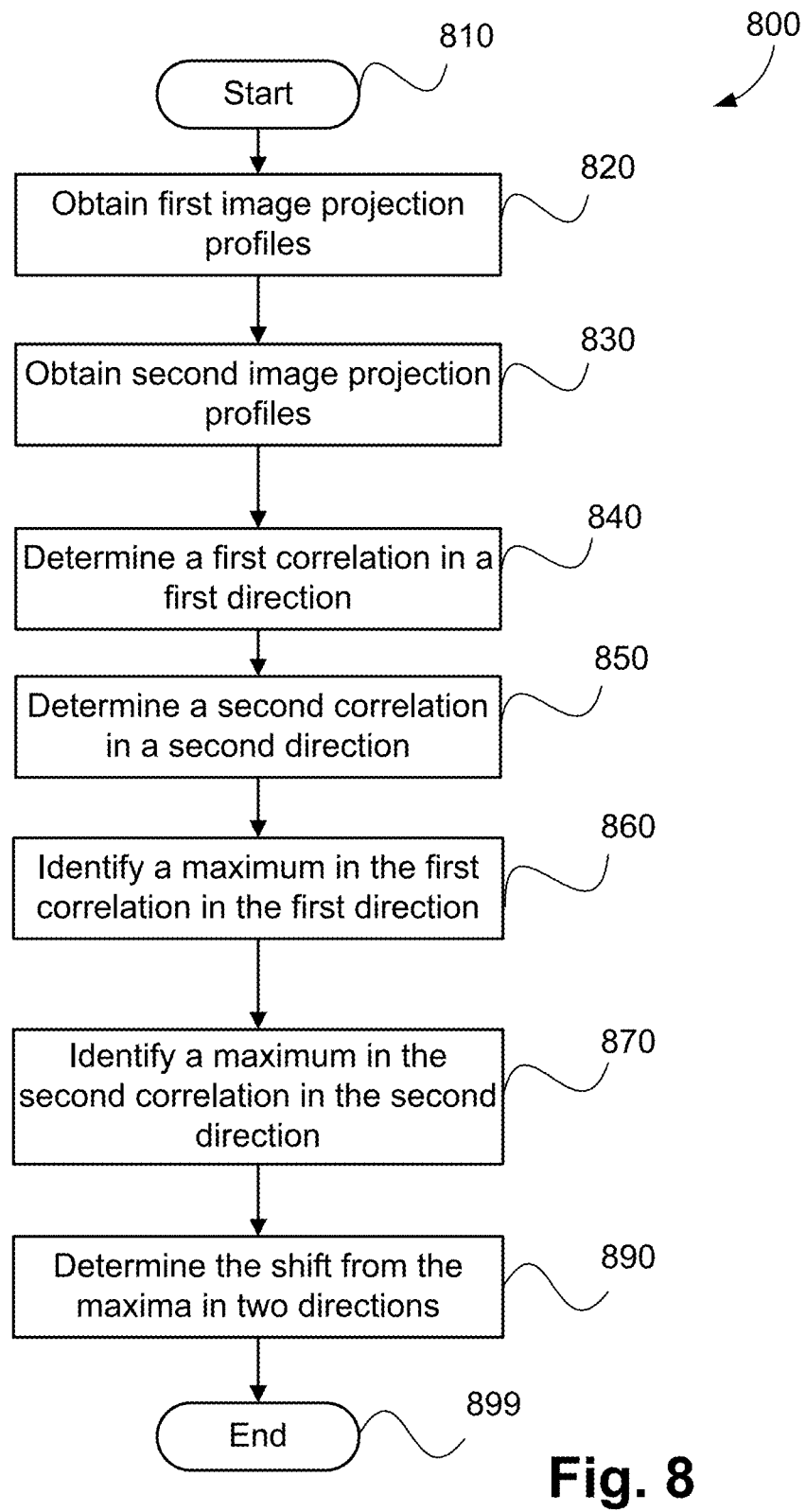
FIG. 8 is a flow diagram of a process of translational motion estimation from image projection profiles.

FIG. 8 shows a flow diagram of a process 800 to estimate a shift between two input images using image projections. The process 800 is preferably implemented as software, for example stored on the HDD 110 and executed by the processor 105. The process 800 begins at a Start step 810 where the processor 105 receives two corresponding image blocks from two video frames (referred to as a first image and a second image in this figure). Control then passes to a first step 820, in which the projection profiles in X- and Y-directions of the first image are determined. In one implementation, the projection profiles of the first image are the projections of the image gradient magnitude along the vertical and horizontal axes of the first image. In another implementation, the projection profiles of the first image are the projections of the sum of image intensities along the vertical and horizontal axes of the first image. In yet another example, the projection profiles can have complex values, where the real component is the projection of the intensity along the vertical or horizontal axes of the first image and the imaginary component is the projection of the gradient magnitude along the vertical or horizontal axes of the first image. Depending on the application, the projection profiles may relate to different properties in the first and second directions. In one example, the projection profiles are the projections of the gradient magnitude in the X-direction and the projections of the intensity in the Y-direction.

In one implementation, the image projection profiles along an axis are determined by summing the relevant characteristics along that axis. For example, when the first image projection profiles in a first projection direction of interest correspond to the projections of the gradient magnitudes along the x-axis, the gradient magnitudes along the X-axis are summed to provide the first image projection profiles in the first projection direction.

Control passes from step 820 to step 830, which determines the projection profiles for the second image. The projection profiles for the second image are the same type or types as the first image projection profiles. That is, if the projection profiles for the first image obtained in step 320 correspond to a gradient magnitude in the X-axis and Y-axis directions, the projection profiles for the second image obtained in step 330 also correspond to a gradient magnitude in the X-axis and Y-axis directions. Similarly, if the first image projection profiles obtained in step 320 correspond to projections of intensity in the x-axis direction and projections of gradient magnitude in the Y-axis projection direction, then the second image projection profiles obtained in step 330 also correspond to projections of intensity in the X-axis direction and projections of gradient magnitude in the Y-axis direction.

Control then passes to step 840, in which a first correlation is performed by the processor 105 between corresponding projection profiles from two input images in a first direction. In one implementation, the first direction is a vertical direction, and the first correlation is cross-correlation of the projections of the gradient magnitudes of the two images along the first direction. A projection can also be referred to as a signal. In this specification, the terms 'projection' and 'signal' are used interchangeably. The projections of the gradient magnitudes are zero-padded and zero-mean signals. A zero-padded zero-mean signal is the signal extended with zeros and subtracted by the mean value of the projection. Control then passes to step 850, wherein a second correlation between corresponding projection profiles from two input images in a second direction is computed by the processor 105. In the above implementation, the second direction is the horizontal direction, and the second correlation is a cross-correlation of the projections of the gradient magnitudes of the two images along the second direction. The projections of the gradient magnitudes are zero-padded and zero-mean signals.

The control then passes to step 860, wherein the processor 105 identifies a maximum in the first correlation in the first direction. Desirably, the maximum corresponds to a global peak with largest one-dimensional Normalised Cross Correlation (1D NCC) scores along a vertical direction, the 1D NCC is calculated as:

$$NCC_{1D} = \frac{1}{NN - 1} \sum_x \frac{(S_1(x) - \overline{S_1})(S_2(x) - \overline{S_2})}{\sigma_{S_1} \sigma_{S_2}} \quad (5)$$

where $S_1$ is the projection profile of the first image in one direction, $S_2$ is the projection profile of the second image in the corresponding direction ($S_1$ and $S_2$ have the same number of pixels), NN is number of elements in $S_1$ and $S_2$, $S_1(x)$ is the value of the element at location (x) in $S_1$, $S_2(x)$ is the value of the element at location (x) in $S_2$, $\overline{S_1}$ is the mean value of the elements in $S_1$, $\overline{S_2}$ is the mean value of the elements in $S_2$, $\sigma_{S_1}$ is the standard deviation of the elements in $S_1$, $\sigma_{S_2}$ is the standard deviation of the elements in $S_2$. In another implementation, the maximum corresponds to a highest local peak of the 1D NCC that is within a predetermined bound to limit the range of allowable motion (to, e.g. within ±20 pixels).

The method 800 then proceeds to step 870, where a maximum in the second correlation in the second direction is identified. Similar criteria for peak selection as in the first direction are applied to the second direction. After identifying the maxima along the first and second directions, the control passes to step 890 to determine the shift from the correlation maxima in two directions. The projection-based shift estimation process 800 terminates at End step 899.

While the projection-based motion estimation process 800 can be applied separately for each pair of corresponding blocks from two input video frames, it is more efficient to pre-compute the projection profiles for all quadtree blocks before correlation of the projection profiles. This concept is illustrated in FIG. 4 for quadtree level 2, in which an input image is divided into 4 quadrants, and quadtree level 3, in which an input image is divided into 16 hexadrants.

Figure 4:
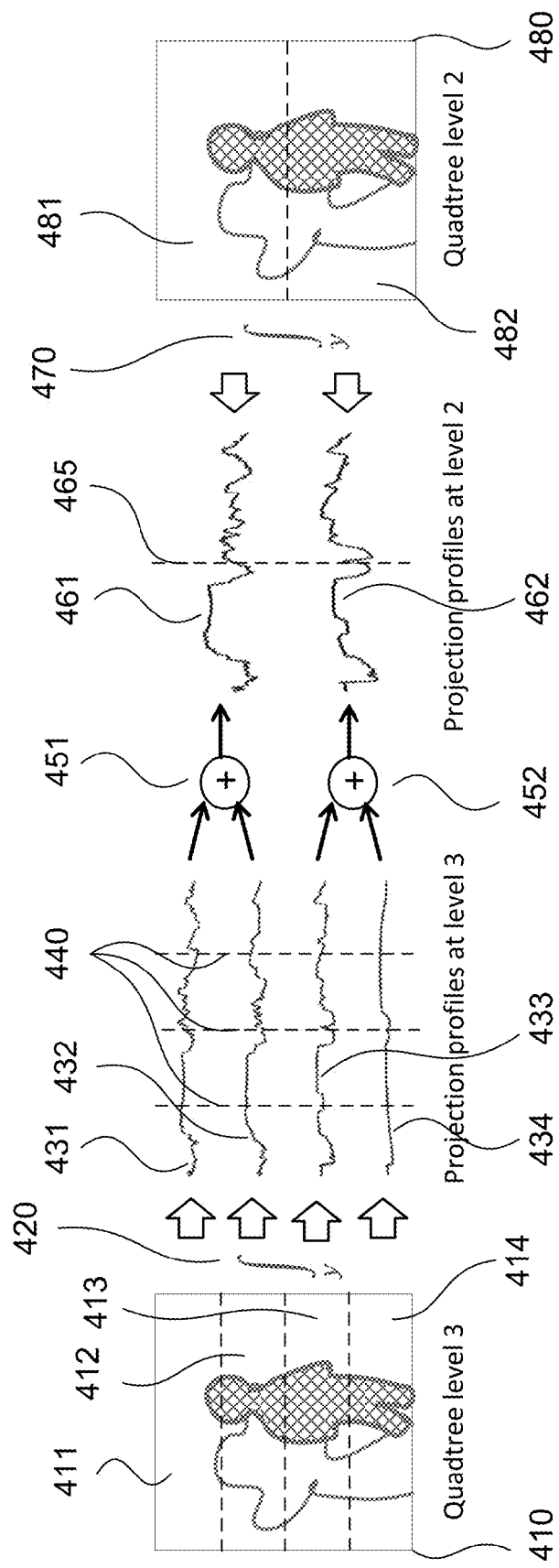
FIG. 4 illustrates a method to determine the projection profiles of image blocks from a coarser quadtree partitioning of an image from the projection profiles of image blocks from a finer quadtree partitioning of the same image.

A scheme for efficient computation of horizontal projection profiles of quadtree blocks in an image is illustrated in FIG. 4. In a quadtree level 3, an image 410 is divided into 16 hexadrant blocks by partitioning the image row into four equal parts and partitioning the image column into four equal parts. For the illustration of block-wise vertical projections, the image 410 is shown to be partitioned into four horizontal image strips 411, 412, 413, 414. The intensities within each horizontal strips is projected along the vertical (y) direction using a projection operator $\int_y$ 420. The projection results in four horizontal profiles 431, 432, 433, 434 corresponding to the four horizontal image strips 411, 412, 413, 414. Each horizontal profile can be divided into four equal parts using the dividers 440 to obtain the horizontal projection profiles of four hexadrant blocks in the corresponding image strip.

For a quadtree level 2, where an image 480 is divided into 4 quadrant blocks by partitioning the image row into two equal parts and partitioning the image column into two equal parts. The image 480 is shown to be partitioned into two large horizontal image strips 481 and 482. The intensities within each of these large strips are projected in the vertical direction (y) by the projection operator $\int_y$ 470 to form two corresponding horizontal profiles 461 and 462. The divider 465 virtually divide each of the horizontal profiles 461 and 462 into two halves, each halve is a horizontal projection profiles of a quadrant block.

If the images 410 and 480 have the same content, the image strips 411 and 412 can be combined to form the large strip 481. Similarly, the image strips 413 and 414 can be combined to form the large strip 482. This suggests that the projection profiles 431 and 432 at quadtree level 3 can be combined by the addition operator 451 to form the projection profile 461 at quadtree level 2. Similarly, the projection profiles 433 and 434 at quadtree level 3 can be combined by the addition operator 452 to form the projection profile 462 at quadtree level 2. In short, projection profiles at a coarser quadtree level can be derived from the projection profiles at a finer quadtree level. This leads to a significant gain in efficiency because an input image need only be traversed once to produce the projection profiles at a finest quadtree level (e.g. level 3 in FIG. 4). Projection profiles of a quadtree block at any level can then be derived from the projection profiles at this finest level. This has been illustrated in FIG. 4 for horizontal projection profiles but the same principle applies to vertical projection profiles.

Figure 5:
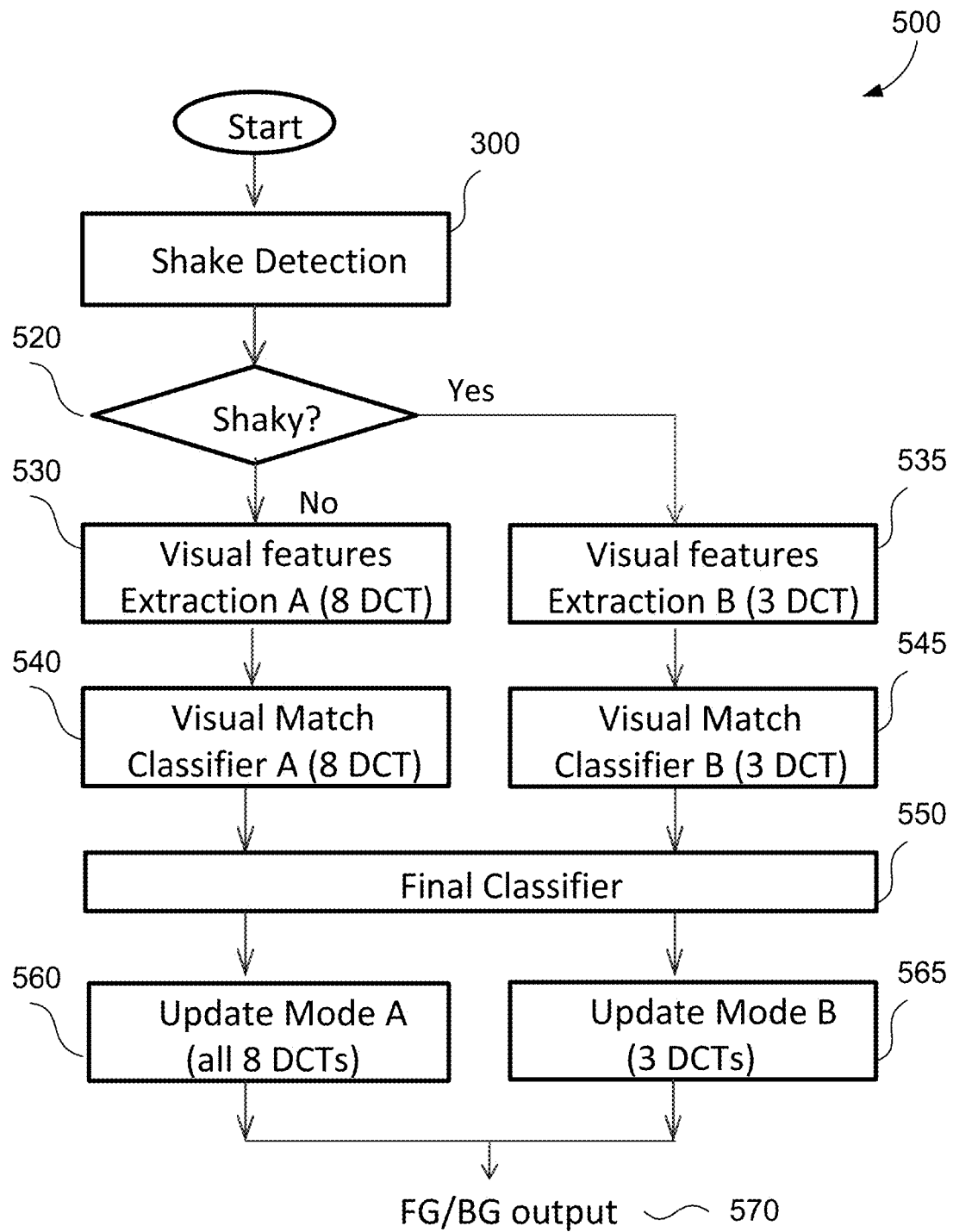
FIG. 5 is a flow diagram of a process of change detection in video using different workflow for shaky and non-shaky frames.

The shake detection process 300 can be used as a part of other video processing system. In FIG. 5, the shake detection 300 is used as an initial or pre-processing step in a video change detection system 500. In particular, the change detection system 500 keeps a model of the background in block discrete cosine transform (DCT) format. A block size of 8×8 is commonly used in JPEG image compression and MJPEG video compression format. Input images are compared against the background for each 8×8 image block in DCT domain to detect change per block. Non-changing input DCT blocks are used to update the background to capture gradual illumination changes in the scene. Depending on whether the incoming frame (which is also referred to as input image) is shaky nor not, as determined by the shake detection system 300, the way change is detected can be modified accordingly. If shake is not present, the system 500 can use a first process (steps 530-560) for change detection from stable video. If shake is present, the system 500 can revert to a second change detection process (steps 535-565) that is more robust to shake. While the second process can handle stable video as well, the first process may be preferable for its faster speed.

If the input image is detected as not shaky (i.e. stable), control from step 520 is passed to step 530, where various parameters or features are extracted from the input image for visual comparison with the background model. Under stable camera condition, up to 8 lowest DCT coefficients can be extracted as visual features in step 530: A example set of visual features or parameters is:

(i) 1 DC coefficient $dc_1$ for luminance,
(ii) 2 first-order AC coefficients $ac_1$ and $ac_2$ for luminance,
(iii) 3 second-order AC coefficients $ac_3$, $ac_4$, and $ac_5$ for luminance, and
(iv) 2 DC coefficients $dc_2$ and $dc_3$ for two chrominance channels.

These visual features $dc_i(I)$ and $ac_j(I)$ (i=1, 2, 3 and j=1, . . . 5) for input DCT block I are compared against the visual features $dc_i(BG)$ and $ac_j(BG)$ (i=1, 2, 3 and j=1, . . . 5) of the corresponding block in the background model in step 540 using a linear combination of absolute differences:

$$D_0 = \Sigma_{i=1}^{3} u_i |dc_i(I) - dc_i(BG)| + \Sigma_{j=1}^{5} w_j |ac_j(I) - ac_j(BG)| \qquad (6)$$

where the weights can take values $u_1$=33/16, $u_2$=25/16, $u_3$=21/16, $w_1$=82/16, $w_2$=82/16, $w_3$=127/16, $w_4$=157/16, $w_5$=122/16. If Do is greater than a threshold $T_{D0}$ (e.g. $T_{D0}$=1158) for a given DCT block, that block is classified by a final classifier 550 as foreground (FG). Otherwise, if $D_0 \le T_{D0}$, the block is classified as background (BG). BG-classified blocks are used to update the background model in step 560 using, for example, approximated median or exponential moving average update. After all DCT blocks in an input image are processed, the change detection system 500 outputs a FG/BG output mask 570, where the mask is a binary image of pixels with intensity 0 at BG blocks and pixels with intensity 1 at FG blocks.

If the input image is detected as shaky, control from step 520 is passed to step 535, where a smaller set of parameters, particularly DCT features, are extracted from the input image for visual comparison with the background model. Under image motion, AC DCT coefficients vary in a more unpredictable way than DC DCT coefficients. As a result, AC coefficients are less robust against camera shake. Step 535 extracts preferably only:

(i) the DC coefficient $dc_1$ for the luminance channel Y, and
(ii) $dc_2$ and $dc_3$ for the two chrominance channels I and Q.

A matching score that involves only the DC coefficients are used in step 545:

$$D_1 = \Sigma_{i=1}^{3} u_i |dc_i(I) - dc_i(BG)| \qquad (7)$$

To classify a DCT block using the matching score $D_1$, step 550 uses another threshold $T_{D1}$, which is lower than $T_{D0}$ (e.g. $T_{D1}$=200). Similar to the stable case, if $D_1 > T_{D0}$ for a given DCT block, that block is classified as FG, otherwise, it is classified as BG by the classifier 550. The control is then passed to step 565, where only DC visual features in the background model is updated. Note that this DC-only matching is suitable for small shake only (e.g., shake with motion less than the size of DCT block of 8 pixels). For larger shake, the background update step 565 can be skipped to avoid that step corrupting the background model.

The shake detection process 300 uses a cascade of motion detectors over a number of quadtree levels. The presence or absence of motion is detected by comparing the estimated motion against the motion thresholds $T_i$ (i=1, 2, 3 . . . ). While a binary decision of 0 for a stable frame and 1 for a shaky frame is sufficient for shake detection, extra information about the shake can be determined from the estimated motion vectors. In one implementation, a 2D global translation can be averaged from reliable motion vectors of the quadtree blocks. In another implementation, a 2D projective transformation can be estimated from reliable motion vectors of at least four background blocks. 2D projective is the theoretical transformation between two images captured by a pin-hole camera with fixed optical centre. In practice, cameras have a finite aperture and optical aberrations. The camera centre may also move under shake. As a result, planar projective transformation, also known as 2D homography, is only an approximation. This approximation is acceptable under small camera motion or planar background. The 2D homography can be used to compensate for the motion of the current frame for video stabilisation.

In particular, the motion of each quadtree block computed in process 300 can be seen as a motion vector at the centre of the block. Motion vectors that result in a small image residual after motion compensation are regarded as reliable motion. Given an image block $I_1$ in the first image, a corresponding image block $I_2$ in the second image, and an estimated translational motion $t=[t_x\ t_y]$ from $I_1$ to $I_2$, the motion compensated block shift($I_1$, t) should roughly align with the second image block $I_2$, (where shift ( ) is the motion compensation operation). The root mean-squared-error (RMSE) of the aligned image blocks should be small, where the RMSE between two equal-sized images $J_1(x,y)$ and $J_2(x,y)$, each with N pixels, is defined as:

$$RMSE(J_1, J_2) = \sqrt{\frac{\sum_{x,y}(J_1(x,y) - J_2(x,y))^2}{N}} \quad (8)$$

Because the RMSE between two similarly low textured blocks is also small irrespective of whether they align or not, a normalised RMSE (NRMSE) measure is introduced to detect this case:

$$NRMSE(J_1, J_2) = \frac{RMSE(J_1, J_2)}{RMSE(J_1, \text{shift}(J_1, [1, 1]))} \quad (9)$$

The NRMSE normalises the RMSE between two images $J_1$ and $J_2$ by an intra-RMSE of the image $J_1$ with a slightly shifted version of itself. The intra-RMSE of the image $J_1$ can be seen as a measure of the texture strength of this image. The NRMSE is larger than 1 if the inter-RMSE on the nominator is larger than the intra-RMSE on the denominator. This happens when two images $J_1$ and $J_2$ are severely misaligned (i.e. the misalignment between $J_1$ and $J_2$ is even greater than the induced misalignment of [1 1] pixel in the intra-RMSE). The NRMSE is around 1 when $J_1$ and $J_2$ both have the same low texture. If the NRMSE between two aligned image blocks shift($I_1$, t) and $I_2$ is much smaller than one (e.g., NRMSE<$T_{NRMSE}$=0.1), the aligned image blocks have a much smaller residual than their texture. This (NRMSE<$T_{NRMSE}$) signifies a good motion compensation and a reliable estimated motion vector t.

Figure 9:
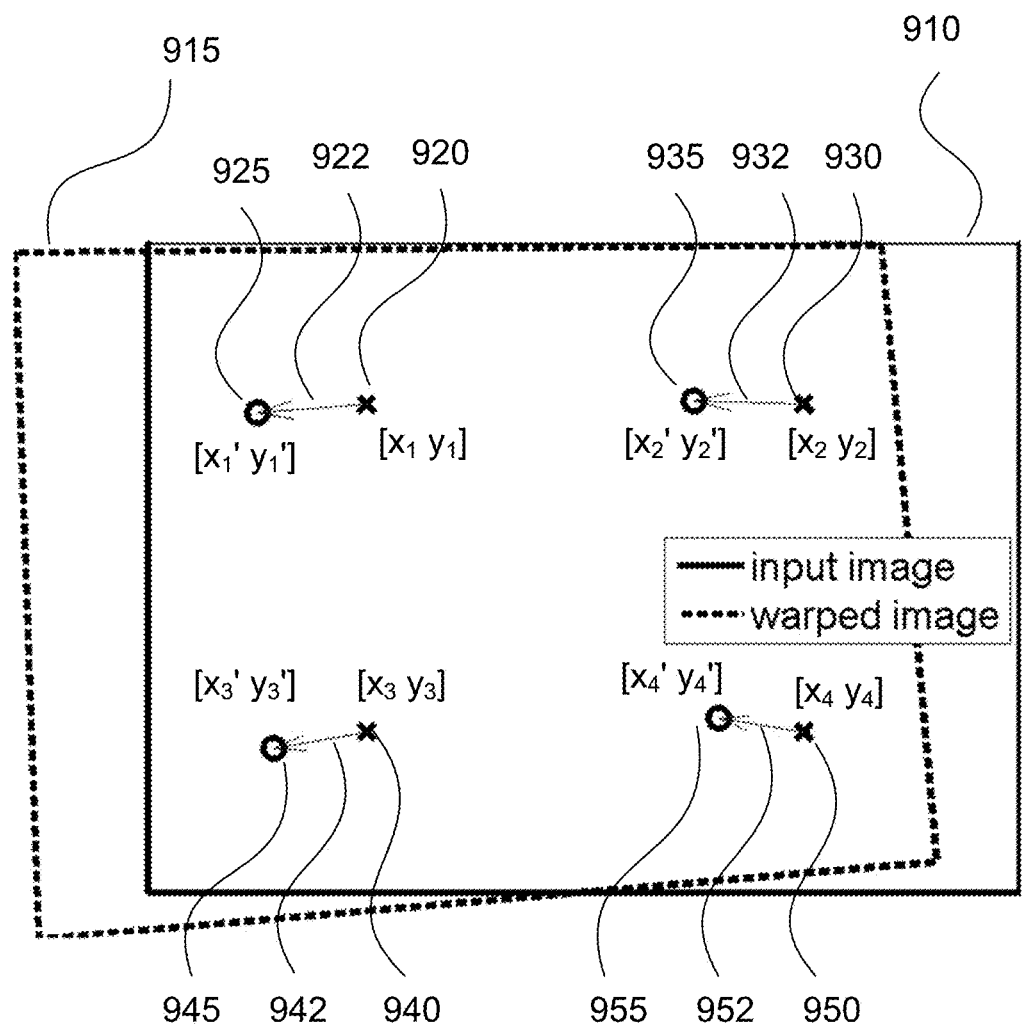
FIG. 9 illustrates the effect of planar homography transformation on a rectangular image.

An example of 2D homography transformation from four reliable motion vectors $[x_i, y_i] \rightarrow [x'_i, y'_i]$ (i=1, 2, 3, 4) is illustrated with the help of FIG. 9. Various motion vectors 922, 932, 942, 952 start at locations $[x_1\ y_1]$, 920, $[x_2\ y_2]$, 930, $[x_3\ y_3]$, 940, $[x_4\ y_4]$, 950, respectively. These starting locations correspond to the centres of the four image quadrants 351, 351, 353, 354 in quadtree level 2 of FIG. 3B. The four motion vectors end at points, $[x'_i, y'_i]$, 925, $[x'_i, y'_i]$, 935, $[x'_i, y'_i]$, 945, $[x'_i, y'_i]$, 945, respectively. From these four point correspondences $[x_i, y_i] \Leftrightarrow [x'_i, y'_i]$ (i=1, 2, 3, 4), a 3×3 projective transformation matrix H can be derived:

$$\begin{bmatrix} x'_{ih} \\ y'_{ih} \\ z'_{ih} \end{bmatrix} = \begin{bmatrix} h_{11} & h_{12} & h_{13} \\ h_{21} & h_{22} & h_{23} \\ h_{31} & h_{32} & h_{33} \end{bmatrix} \begin{bmatrix} x_i \\ y_i \\ 1 \end{bmatrix},$$

where $[x'_{ih}\ y'_{ih}\ z'_{ih}]^T$ are the homogeneous coordinates of the end points $[x'_i\ y'_i]=[x'_{ih}/z'_{ih}\ y'_{ih}/z'_{ih}]$. Under this 2D projective transformation, a rectangular input image 910 is transformed to a skewed quadrilateral 915 after homography motion compensation. As mention earlier, a homography matrix H required four or more point correspondences to solve. While four point correspondences define an exact 2D homography, more point correspondences can be used. This will lead to a least-squares estimate of the homography matrix H.

Figure 6:
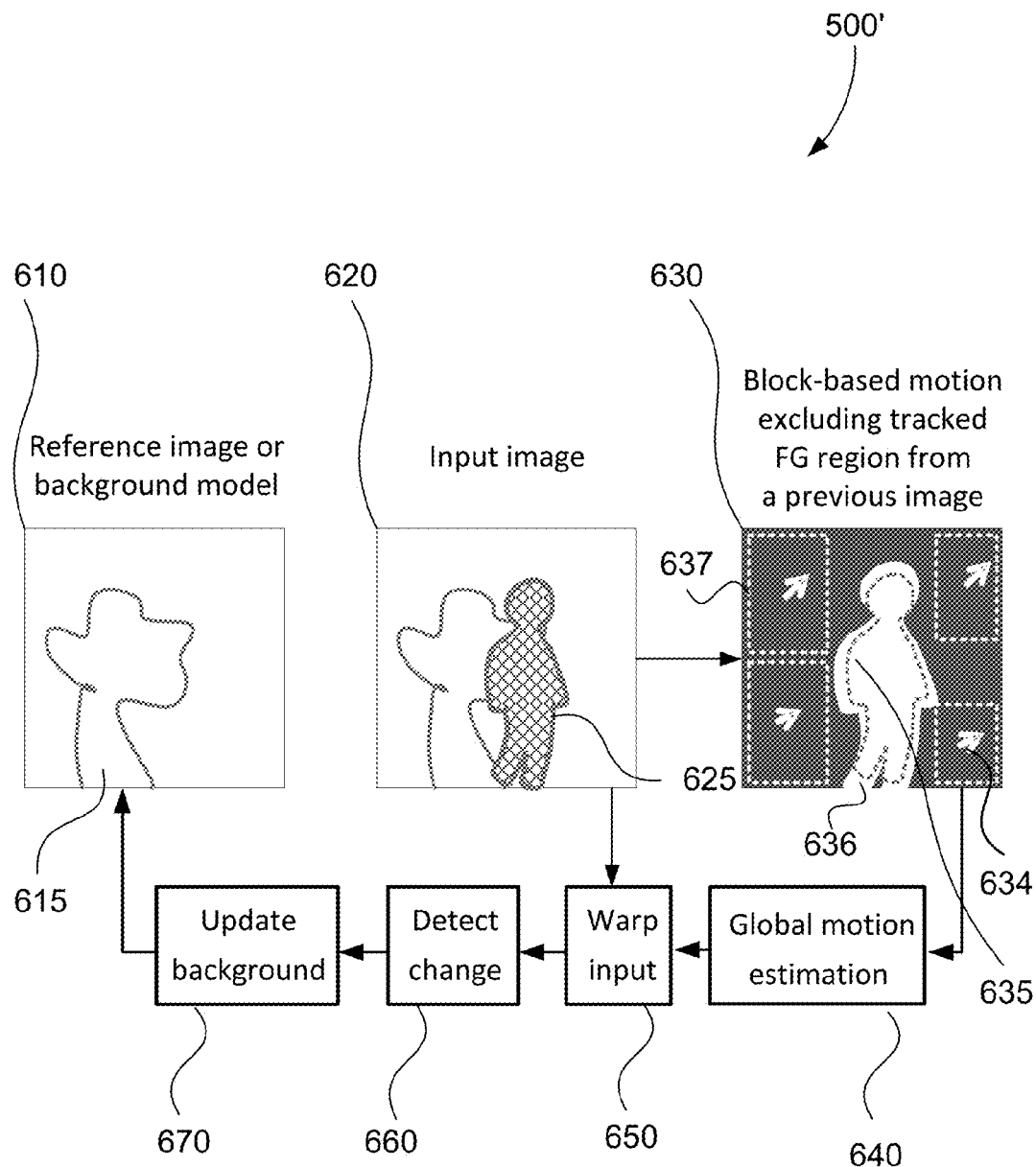
FIG. 6 illustrates a concept of change detection in video using a globally aligned image computed from the motion of background blocks.

The estimated global motion between an input image and a previous image can be used stabilise the shaky video before change detection and background modelling. FIG. 6 illustrates the concept for an implementation 500' of the method 500 where change is to be detected between an input image 620 and a background model 610, which is also referred to as a reference image. In FIG. 6, the background contains a tree 615 and the input image 620 has a person 625 walking in front of the tree. Using reliable estimated motion vectors from some image blocks such as image block 637, a global motion is estimated in step 640. The global motion can be a 2D translation, a 2D homography, or some other specific transformation. Using this estimated global transformation, the input image 620 is warped into alignment with the reference image in step 650, before change is detected for the aligned input image in step 660. Finally, the background-classified pixels or image blocks are updated in the background model in step 670.

The purpose of quadtree block partitioning in the shake detection system 300 is to reduce the size of image block until some blocks do not contain foreground objects. The motion vectors of these background-only blocks are likely to be reliable (i.e. having a low NRMSE) and therefore can be used for background motion detection or estimation. Another way to select image blocks that do not contain foreground is to use foreground tracking. In a change detection system, a previously detected foreground mask of a previous frame is available for every frame except the first frame of the video. Under some assumption of the foreground motion (e.g. foreground does not move more than $t_{max}$=10 pixels from one frame to the next), a probable foreground mask can be predicted for the current frame using the foreground from a previous frame. Image blocks can then be selected outside this probable foreground mask for reliable background motion estimation.

The concept of using tracked foreground to locate probable background blocks is illustrated in image 630 in FIG. 6. Image 630 represent a probable foreground mask of a current input image 620, where white intensities correspond to probable foreground region and black intensities correspond to probable background region. A foreground object 635 (enclosed by the grey dotted line) detected from a previous frame is dilated in the current frame to a probable foreground region 636. Under a constraint that the foreground object 635 does not move more than $t_{max}$ pixels from previous frame to the current one, the yet-to-defined foreground object in the current frame is likely to stay within the dilated mask 636. Background blocks can therefore be selected outside this probable foreground mask 636 as shown by the white dotted blocks such as image block 637. The translational motions 634 of these probable background blocks 637 are computed and tested for reliability using the NMRSE<$T_{NRMSE}$ criterion. Reliable background motion vectors are then used to estimate global background motion in step 640.

Instead of using a dilated foreground mask of a previous frame as probable foreground region in a current frame, the probable foreground region in a current frame can be derived from the foreground mask of a previous frame by tracking the corresponding foreground mask across multiple frames. Using motion tracking models such as constant velocity or constant acceleration, the location of the foreground object in the current frame can be predicted. The tracked foreground mask at the predicted location forms a probable foreground region. To allow for tracking error, the tracked foreground mask could be dilated slightly (e.g. a couple of pixels dilation) to form a probable foreground region.

INDUSTRIAL APPLICABILITY

The arrangements described are applicable to the computer and data processing industries and particularly for the separation of foreground and background objects in video sequences, such as surveillance video.

Particularly, the arrangements described have been shown by the present inventors to offer improvements in at least one of the following characteristics: edge-following, accurate, automatic seed selection, and practical computational requirements, and significantly in specific implementations, improvements in each of those characteristics.

The shake and motion detection arrangements described above, and particularly the methods 300, 500 and 800 are suited to implementation within the camera 127, where for example the processor 105 is an embedded device, or as described where a computer module 101 processes the images after capture by the camera 127. Specific implementations, such as surveillance, lend themselves to the computer module 101 operating as a server computer, for example in a cloud computing environment, where images are transferred from the camera 127 to one of the networks 120, 122, perhaps via an intermediary computing device, for remote processing by the server computer.

The foregoing describes only some embodiments of the present invention, and modifications and/or changes can be made thereto without departing from the scope and spirit of the invention, the embodiments being illustrative and not restrictive.

We claim:

1. A method of detecting shake of a camera, comprising:
capturing an image with the camera;
determining a magnitude of a motion from at least the image;
where the determined magnitude of motion is not larger than a first threshold, determining the camera to be stable;
where the determined magnitude of motion is larger than the first threshold, determining if a magnitude of motion for each of a number of blocks of the image is larger than at least one further threshold; and
determining the shake of camera based on a number of blocks having a magnitude of motion exceeding the at least one further threshold,
wherein the at least one further threshold comprises a second threshold associated with a first block, and a third threshold associated with a second block whose size is not larger than the first block, and
wherein the at least one further threshold comprises the second threshold associated with a quadtree level 2 number of blocks, and the third threshold associated with a quadtree level 3 number of blocks.

2. A method according to claim 1, wherein the first threshold is smaller than the at least one further threshold.

3. A method according to claim 1, wherein the motion between corresponding blocks in the image is computed from correlation of image projection profiles.

4. A method according to claim 3, wherein the image projection profiles comprise a sum of image intensities along a projection direction of the image projection profiles.

5. A method according to claim 3, wherein the image projection profiles comprise a sum of image gradient magnitudes along a projection direction of the image projection profiles.

6. A method according to claim 3, wherein the image projection profiles are complex with a real component and an imaginary component being one of (i) a sum of image intensities along a projection direction of the image projection profiles, and (ii) a sum of image gradient magnitudes along the projection direction.

7. A method according to claim 3, wherein the image projection profiles are pre-computed for quadtree blocks at a finest level, from which image projection profiles for quadtree blocks at coarser levels are derived.

8. A method of determining stability of a camera, comprising:
capturing an image with the camera;
(A) determining a magnitude of motion for each of a number of blocks of a current sub-division of the image;
(B) determining a number of blocks having magnitudes of motion not larger than a magnitude threshold associated with the current sub-division, and where the determined number is greater than or equal to a region threshold associated with the number of blocks in the current sub-division, (i) determining the camera to be stable, or otherwise (ii) dividing the current sub-division of the image into a further sub-division, and repeating steps (A) and (B) upon the further sub-division,
wherein the sub-division is a global cascading quad-tree sub-division, and
wherein after three traversals of step (B) the camera is not determined to be stable, the camera is deemed to be unstable.

9. A method according to claim 8 wherein step (A) is performed at least twice.

10. Apparatus for detecting shake of a camera, the apparatus comprising:

an input for an image captured with the camera;
a processor coupled to the input and configured to:
  determine a magnitude of a motion from at least the image, and where the determined magnitude of motion is not larger than a first threshold, determining the camera to be stable; and
  where the determined magnitude of motion is larger than the first threshold, determining if a magnitude of motion for each of a number of blocks of the image is larger than at least one further threshold, and determining the shake of camera based on the number of blocks having a magnitude of motion exceeding the at least one further threshold,
wherein the at least one further threshold comprises a second threshold associated with a first block, and a third threshold associated with a second block whose size is not larger than the first block, and
wherein the at least one further threshold comprises the second threshold associated with a quadtree level 2 number of blocks, and the third threshold associated with a quadtree level 3 number of blocks.

11. Apparatus according to claim 10 wherein the apparatus is one of (i) formed within the camera, (ii) a computing device to which the camera can be coupled, and (iii) a server computer to which the camera couples via a network, and the input includes a memory into which the image captured from the camera is stored.

* * * * *